United States Patent [19]

Kuhlman et al.

[11] 4,350,296

[45] Sep. 21, 1982

[54] ACCESS SLEEVE FOR DRIP IRRIGATION EMITTERS

[75] Inventors: Ora F. Kuhlman, Portuguese Bend; Samuel Tobey, Encino, both of Calif.

[73] Assignee: Technical Irrigation Products, Inc., Lawndale, Calif.

[21] Appl. No.: 158,915

[22] Filed: Jun. 12, 1980

[51] Int. Cl.³ .............................................. A01G 25/06
[52] U.S. Cl. ................................ 239/201; 239/288.5; 47/48.5; 405/36
[58] Field of Search ............ 239/201, 202, 288, 288.3, 239/288.5; 405/36, 37, 39, 43, 48; 47/25, 48.5

[56] References Cited

U.S. PATENT DOCUMENTS

| 3,193,205 | 7/1965 | Hanson | 239/201 X |
| 3,343,796 | 9/1967 | Trickey | 239/201 |
| 3,929,288 | 12/1975 | Brusadin | 239/201 |

Primary Examiner—Robert B. Reeves
Assistant Examiner—Paul A. Sobel
Attorney, Agent, or Firm—Lewis B. Sternfels

[57] ABSTRACT

A protective sleeve (12) includes a plurality of slots (26) for receiving a hose (16). Distribution tubing (18) is attached to the hose within the protective sleeve and extends out of unused slots, with or without aid of a supportive gate (36), to the soil. A cap (14) engages the protective sleeve and includes an extension (58) which bears against the hose and the gate to retain the same in place.

9 Claims, 7 Drawing Figures

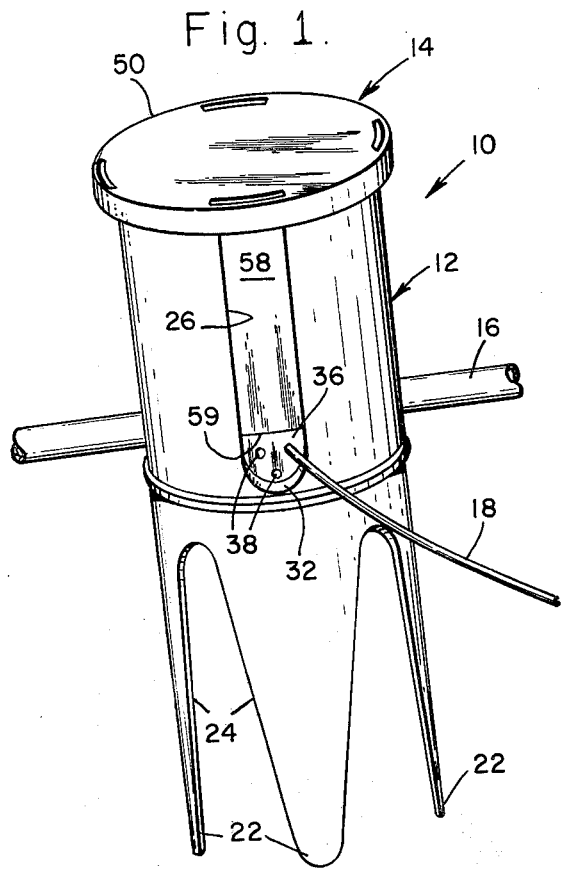
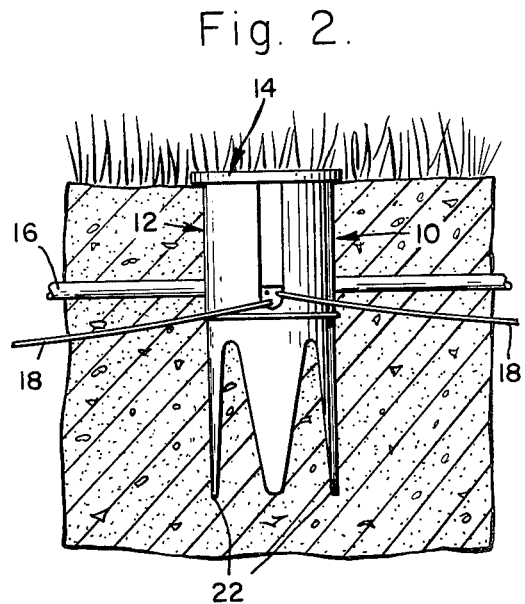
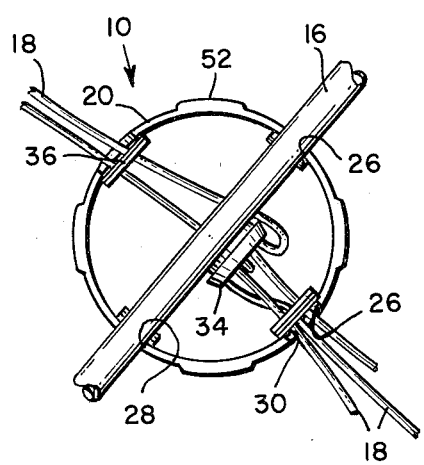
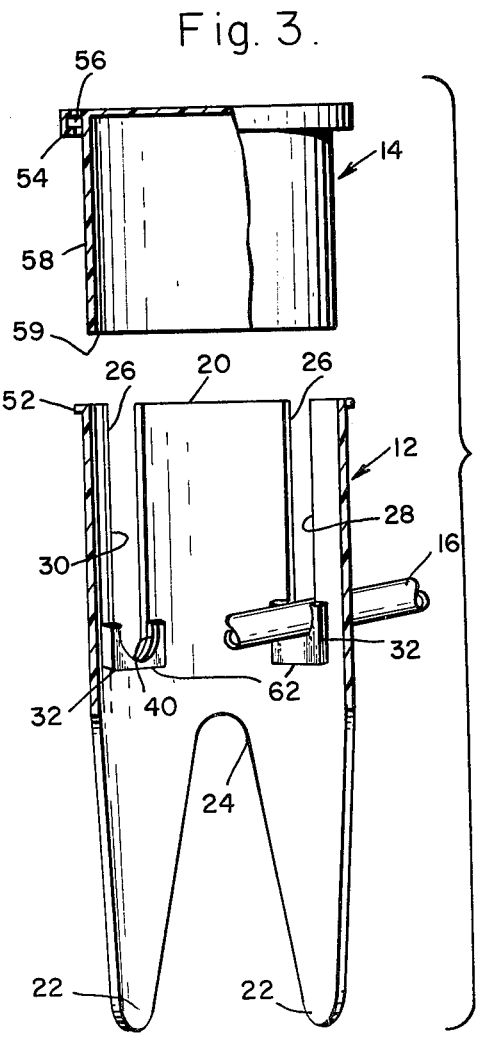

Fig. 5.
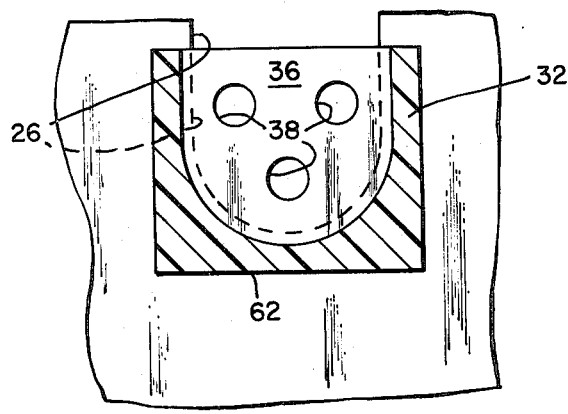
Fig. 6.
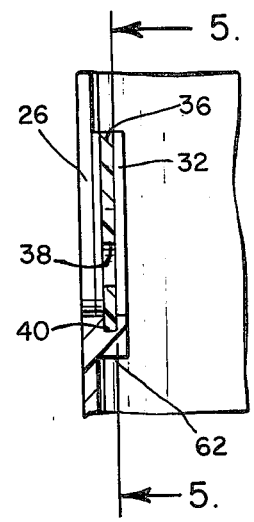
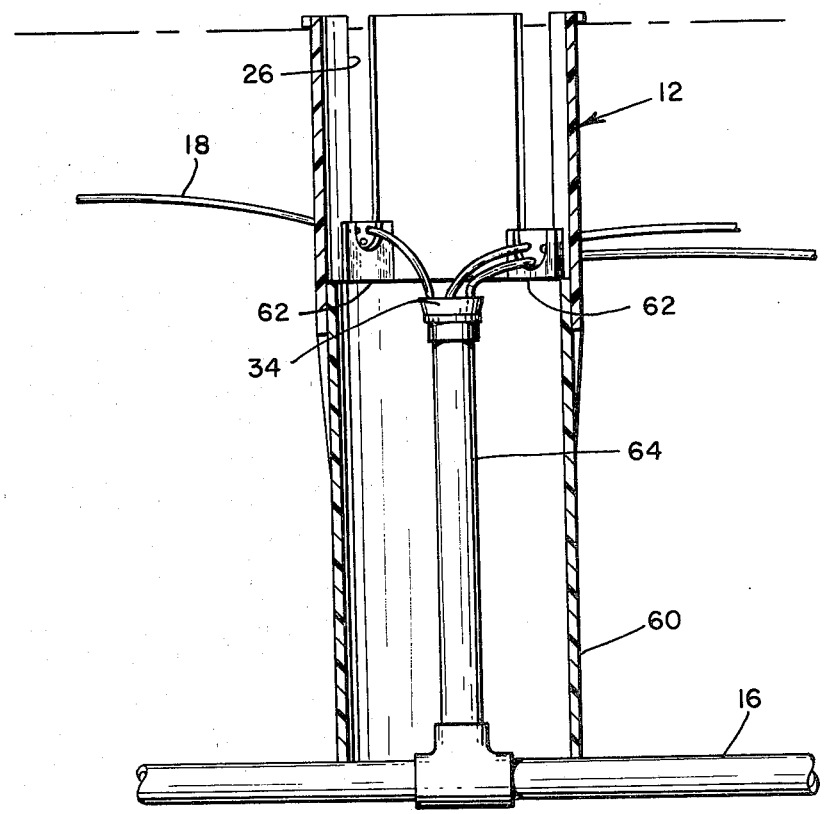
Fig. 7.

ACCESS SLEEVE FOR DRIP IRRIGATION EMITTERS

BACKGROUND OF THE INVENTION

1. Field of the Invention

The present invention relates to drip irrigation and, in particular, to protection of subterranean installations.

2. Description of the Prior Art

Drip irrigation emitters can easily be damaged or vandalized if placed on the surface of the ground. The damage can be the result of vehicular or pedestrian traffic associated with installation or maintenance of plants or crops. Specifically, this damage can be caused by planting or harvesting machines, mowing equipment, truck-mounted sprayers, or simply personnel harvesting crops manually. In the case of landscaping, recreational vehicles can be a problem, or for parking lot and roadside plant irrigation, ordinary automotive vehicles can damage the irrigation system. Vandalism and even simple pedestrian traffic is destructive to such systems in parks, golf courses, and other recreational areas. Additionally, animal wildlife damages and ultra-violet light deteriorates surface installations.

A conventional method for avoiding such problems is to bury the emitters underground. This method, however, introduces several new problems, of which the following may be considered to be illustrative. First, the emitter becomes clogged due to backflow of mud after completion of an irrigation cycle, or due to plant roots entering the emitter's outlet parts. Second, it is not possible visually to observe the emitter to determine if it is operating properly. Third, it is difficult to obtain easy physical access of the emitter for adjustment, replacement, and/or maintenance purposes. Fourth, the emitter is susceptible to attack by underground rodents.

SUMMARY OF THE INVENTION

These and other problems are avoided and overcome by placing the emitter or emitters, as attached to the supply hose, in a protective sleeve and burying the total assembly underground. To obtain access, the protective sleeve extends to the surface where a cap or other closure is removed from the sleeve to expose the emitter. Diametrically placed pairs of slots, preferably of various widths, are disposed to receive different sizes of supply hose. An extension from the cap extends along the sleeve and into engagement with the supply hose for retention thereof in place. Unused slots may be used for extending distribution tubing from an emitter to a remote point of the soil. A gate with holes for receiving the distribution tubing may be set within the slots and also retained therein by the cap extension.

It is, therefore, an object of the invention to provide for protective burial of drip irrigation emitters.

Another object is to provide for easy access to such emitters.

A further object is to minimize or eliminate emitter clogging.

Another object is to provide a simple, inexpensive and easily manufactured protective sleeve for drip irrigation emitters.

Another object of the present invention is to protect drip irrigation emitters from human, animal and environmental damage.

Another object of the present invention is to facilitate inspection, adjustment, cleaning, repair and/or replacement of buried emitters by providing easy visual and physical access thereto.

Another object of the present invention is to provide a means by which a buried emitter may be located.

Another object of the present invention is to provide for a protective sleeve adaptable to several types of single or multiple outlet emitters, and various sizes of supply hose, which can be firmly held in position.

Another object of the present invention is to provide for such an emitter which is simple to install and easy to use.

Another object of the present invention is to provide for a sleeve capable of protecting emitters at any depth in the soil.

Other aims and objects, as well as a more complete understanding of the present invention, will appear from the following explanation of exemplary embodiments and the accompanying drawings thereof.

BRIEF DESCRIPTION OF THE DRAWINGS

FIG. 1 is a perspective view of the invention with a main hose and distribution tubing protected thereby;

FIG. 2 is a view of the invention in emplacement in the soil;

FIG. 3 is a cross-sectional view in elevation of the invention;

FIG. 4 is a top view of the sleeve;

FIG. 5 is a detail view in cross-section of a gate in the sleeve for support of the distribution tubing;

FIG. 6 is a cross-sectional side view of the gate and sleeve of FIG. 5; and

FIG. 7 illustrates a means of extending the length of the sleeve.

DESCRIPTION OF THE PREFERRED EMBODIMENT

As shown in FIGS. 1 and 2, an assembly 10, comprising a sleeve 12 and its closure cap 14, protectively encloses the connection between a main supply hose 16 and distribution tubing 18 extending therefrom. Sleeve 12 preferably comprises an elongated cylinder having a circular opening 20 at its upper end and a plurality of legs 22 extending downwardly. The legs are formed by a plurality of cuts 24 which permit greater flow of water, if needed, from within the sleeve. Additionally, legs 22 facilitate installation, and prevent rotation of the assembly in the soil.

As additionally depicted in FIGS. 3 and 4, formed in the sleeve and extending downwardly from its opening 20 are a plurality of slots 26, illustrated as comprising two pairs 28 and 30. Slot pair 28 are about one-half inch in width, while slots 30 are approximately three-fourths inch in width to accommodate respective hose sizes of conventional diameter. The slots are provided with extended bases 32 used, in part, to provide a larger surface for support of the hose extending through the sleeve.

Therefore, hose 16 resides within slot pair 28 and rests against bases 32 of the slots. Distribution tubing 18 is secured to tube 16 through the intermediary of an emitter 34, such as that depicted in U.S. Pat. No. 4,059,228. The distribution tubing may be extended through an unused slot of pair 30 or, alternatively, may be supported by a gate 36, as also illustrated in FIGS. 5 and 6. Specifically, the gate includes a plurality of small holes 38 which are sized to accommodate distribution tubing 18. The gates have a flat configuration which is disposed to slip within a grooved seat 40 provided in base 32.

As best shown in FIG. 3, sleeve 12 is closed off by a cap 50 which may be latched to opening 20 by means of cooperating lugs 52 on the sleeve and lug retainers 54 on the cap. A rear wall 56 in the lug retainer permits the cap to be placed at top opening 20 and rotated until an end of the lug engages wall 56.

Cap 50 is provided with an extension 58 which has a length sufficient, as shown in FIG. 1, to permit engagement of its lower edge 59 engages tube 16 and gate 36. Thus, when the cap is latched to the sleeve, extension 58 bears against the hose and the gate to retain them securely in place.

In the event that the depth of the main hose is greater than the length of sleeve 12, as shown in FIG. 7, the sleeve may be extended downwardly by inserting an extension 60 of any desired length into sleeve 12 and on the main hose. Such an extension is designed to fit within the sleeve so that it will abut against bases 32 at their lower surfaces 62. Thus, the sleeve may be extended to the surface of the soil to be closed off by cap 50. The extension also may be used to stabilize the sleeve in loose and/or shifting terrain. In addition, it can also be used as a guide, protector and positioner for a riser 64 extending from a deeply buried main hose 16. Distribution tubing 18 may be coupled to an emitter 34 at the top of the riser and fed through the otherwise unused slots 26.

To insure further isolation of the connection between hose 16 and distribution tubing 18, or if irrigating water is to drip downwardly towards legs 22 without use of distribution tubing, rock material may be placed at the bottom part of sleeve 12 within legs 22.

Although the invention has been described with reference to a particular embodiment thereof, it should be realized that various changes and modifications may be made therein without departing from the spirit and scope of the invention.

We claim:

1. In an irrigation system having a distribution hose to which an emitter is attached for supply of water to soil, the improvement in permitting protective burial of said hose and said emitter in the soil comprising:
    a sleeve having an opening at the surface of and extending into the soil and about said emitter and portions of said hose secured thereto, said sleeve further having at least one slot with a base at the bottom thereof for supporting said hose; and
    a cap removably secured to said sleeve at its opening for closing said sleeve and enclosing said hose and said emitter within said sleeve and for permitting access thereto, said cap including a tubular extension fittably interengageable with said sleeve and extensible into butting engagement with said hose to secure said hose at said slot base and within said sleeve.

2. The improvement according to claim 1 in which said sleeve includes at least one further slot, and further including distribution tubing extending from said emitter through said further slot to the soil.

3. The improvement according to claim 2 in which said further slot has a base at the bottom thereof, and further including a gate receivable in said further slot and forced into said base thereof when in butting engagement with said tubular extension of said cap, said gate having at least one opening therein for receipt and support of said distribution tubing.

4. The improvement according to claim 3 in which said gate has a flat configuration, and further including a grooved seat in said base of said further slot and configured to receive said gate for retention of said gate in said further slot base.

5. The improvement according to claim 1 further including at least two pairs of slots having different opening sizes to accommodate respective diameters of hoses.

6. The improvement according to claim 1 further including at least one abutment adjacent said slot base, and a separate tubular sleeve extension fittably interengageable with said sleeve and abutable against said abutment for extension of said sleeve into protective engagement with said hose.

7. The improvement according to claim 1 further including legs extending downwardly from said hose and said emitter in a direction opposite from said sleeve opening for providing additional tubular space surrounding said hose and said emitter.

8. The improvement according to claim 7 further including rock material placable within said legs.

9. In an irrigation system having a conduit to which a fluid handling device is attached, the improvement in permitting protective burial of said conduit and said fluid handling device in the soil comprising:
    a sleeve having an opening at the surface of and extending into the soil and about said fluid handling device and portions of said conduit attached thereto, said sleeve further having at least one slot with a base at the bottom thereof for supporting said conduit; and
    a cap removably secured to said sleeve at its opening for closing said sleeve and enclosing said conduit and said fluid handling device within said sleeve and for permitting access thereto, said cap including a tubular extension fittably interengageable with said sleeve and extensible into butting engagement with said conduit to secure said conduit at said slot base and within said sleeve.

* * * * *